Aug. 23, 1927.
J. A. DES ROSIERS
SIGNAL
Filed June 22, 1925    2 Sheets-Sheet 1
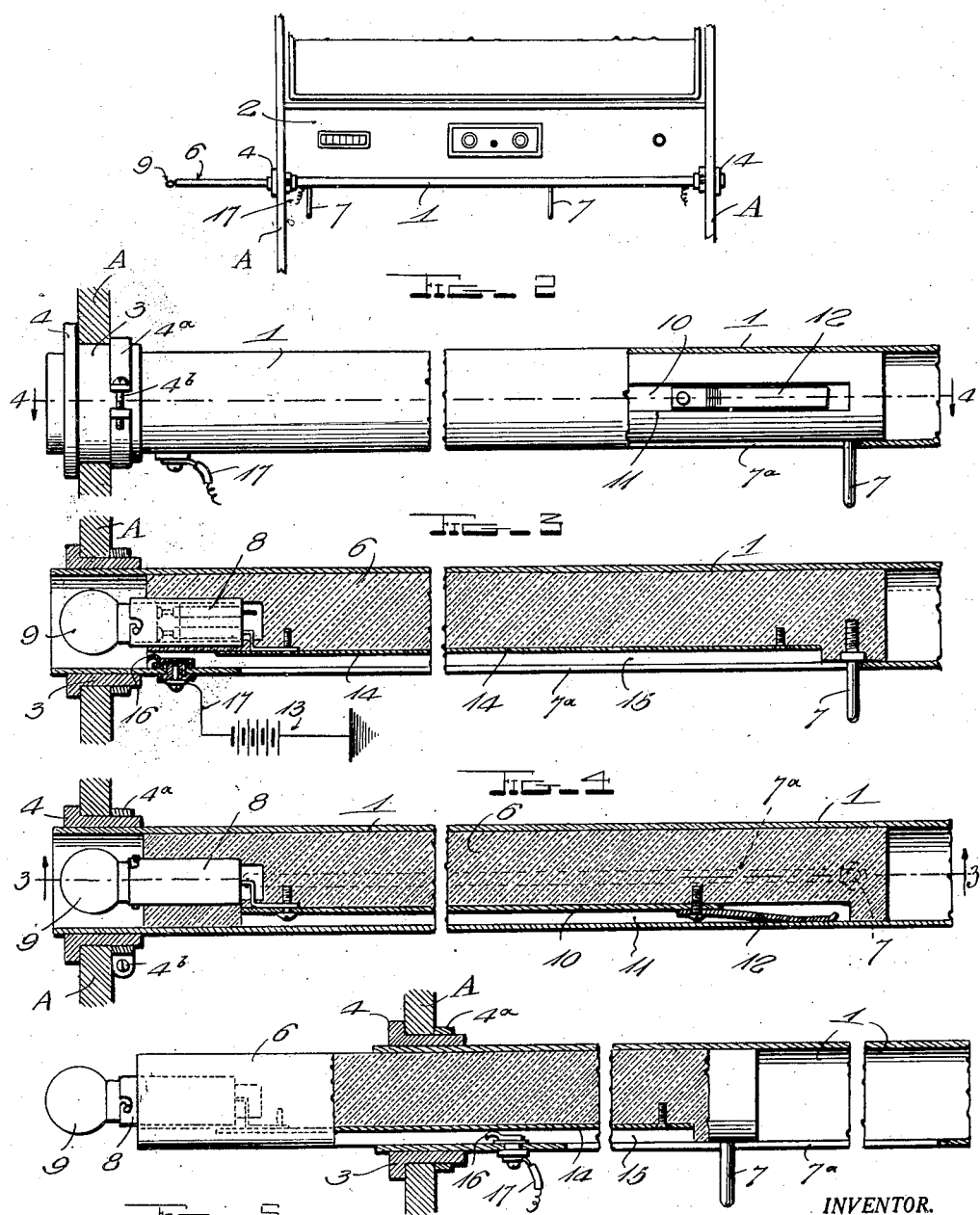
INVENTOR.
John Arthur Des Rosiers,
BY
ATTORNEY.

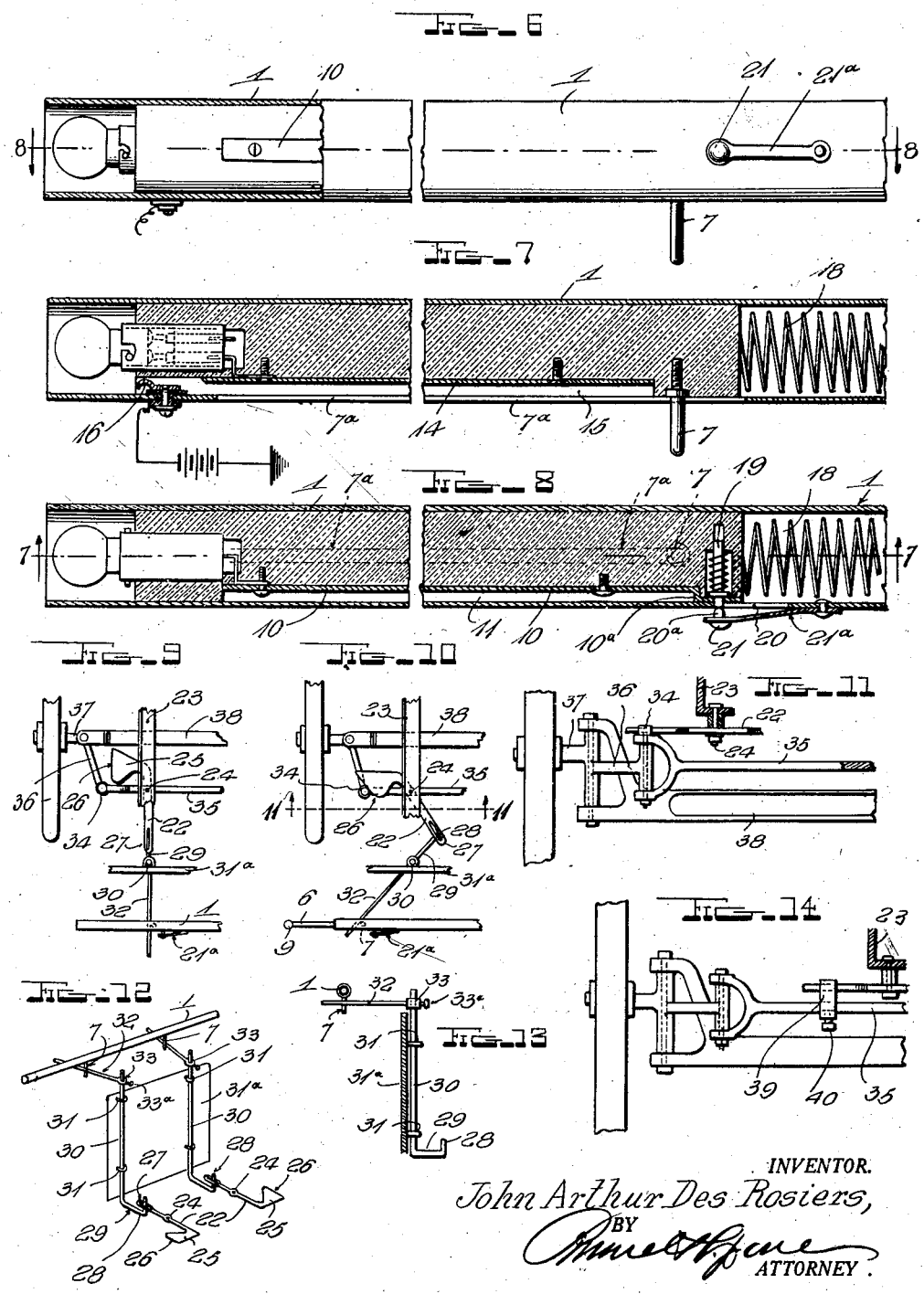

Patented Aug. 23, 1927.

1,640,266

UNITED STATES PATENT OFFICE.

JOHN ARTHUR DES ROSIERS, OF TORONTO, ONTARIO, CANADA.

SIGNAL.

Application filed June 22, 1925, Serial No. 38,756, and in Canada February 10, 1925.

My invention relates to a signaling device for motor vehicles, and has for its primary object the construction of a novel type of signaling device that may be operated for giving signals to following and approaching vehicles, also pedestrians and police officers on point or station duty.

Another object of the invention is to provide a signal device having signaling elements for projection at one side or the other of the vehicle as required, each of said signaling elements comprising a signal arm and a signal lamp carried thereby, which lamp is adapted to be illuminated when the arm is projected for signal purposes.

Still another object of the invention is to provide a signal device, the movable elements of which will be automatically moved to a signaling position, upon the release of a catch of simple construction and automatically returned to non-signaling position through the actuation of the steering mechanism.

Still another object of the invention is to provide a signaling device embodying a signal arm or plunger operating as a signal member, and carrying an electric lamp operating as an auxiliary signal member, so that the device may be employed for day or night use, together with switch mechanism for causing the lamp to glow when the signal arm is projected and to be darkened when the signal arm is retracted, said lamp producing a light streak for better directing attention to the signal and causing it to be observed.

With these and other objects in view, the invention consists of the features of construction, combination and arrangement of parts, hereinafter fully described and claimed, reference being had to the accompanying drawings, in which:—

Figure 1 is a transverse section through a portion of an automobile, looking toward the instrument board, and showing a manually operable form of my invention.

Figure 2 is a side elevation, on an enlarged scale and with a portion of the casing tube broken away, of a portion of the signal device shown in Figure 1.

Figure 3 is a vertical section of the same on the line 3—3 of Figure 4.

Figure 4 is a horizontal section of the same on line 4—4 of Figure 2.

Figure 5 is a view similar to Figure 3, showing a signal arm projected for operation.

Figure 6 is a view of the device, corresponding to Figure 2, as adapted for semi-automatic operation.

Figure 7 is a section on line 7—7 of Figure 8.

Figure 8 is a section on line 8—8 of Figure 6.

Figure 9 is a diagrammatic plan view showing a signal arm in retracted position and associated steering gear retracting means in normal position.

Figure 10 is a view similar to Figure 9, showing a signal arm projected and the associated steering gear actuating means set for retracting the arm on a turning movement of the steering gear.

Figure 11 is a vertical section taken on such a plane as that indicated by line 11—11 of Figure 10.

Figure 12 is a diagrammatic perspective view of the instrument board and parts of the signal mechanism.

Figure 13 is a sectional side elevation thereof.

Figure 14 is a view similar to Figure 11 showing a modification in the means for retracting a signal arm from the steering gear.

In Figures 1 to 5, inclusive, I have shown my invention in its simplest form, the same being adapted wholly for manual operation and consisting of a metallic tube 1 extending under the instrument board 2 between the sides A of the car, said tube being fitted in bushings 3, fitted within openings in the sides A. Each of these bushings has a flange or collar 4 at its outer end to hold it from inward displacement and is provided at its inner end with a split collar 4ª, having its ends united by a screw or bolt 4ᵇ, said collar serving to hold the bushing from outward displacement. The tube 1 is firmly held by the bushings, and has mounted in each end thereof a signal arm 6 of plunger type and formed in whole or part of insulating material or suitably insulated from said tube 1. Each arm 6 is adapted to be shifted outwardly beyond the adjacent end of the tube to display position, and drawn backwardly into the tube to non-display position. The entire surface or the portion of the arm which is projected for display purposes may be striped, painted or colored in a distinctive manner for display purposes. Each plunger arm 6 is adapted to be shifted outwardly and inwardly by a finger piece or pin 7 movable in a guide slot 7ª in the tube, so that the driver of the vehicle may manually project and retract the signal at will. A signal plunger arm of the type indicated is provided in each end of the tube for signal projection beyond the adjacent side of the vehicle, thus allowing a signal to be given at the right or left hand side of the vehicle as desired or required for an efficient signaling action. Carried at the outer end of each plunger signal arm is a socket 8 in which is fitted an electric signal lamp 9. One terminal of the lamp socket is connected with one end of a contact strip 10 disposed in a groove or recess 11 in the plunger, the other end of which contact strip is connected with a spring brush 12 in sliding contact with the wall of the tube 1 and suitably connected in practice, as through the tube 1 and frame or body of the car, with the grounded side of the ignition or lighting circuit, conventionally illustrated at 13. The other terminal of the lamp is connected with a contact strip 14 fitted within a groove 15 in the signal arm and adapted for engagement with a spring contact 16 connected with and insulated from the tube 1, said contact 16 being connected with a conductor 17 leading to the feed side of circuit 13, the construction being such that when the plunger 6 is projected to a greater or less extent, as shown in Figures 1 and 5, contact 14 will engage contact 16 and close the lamp circuit and cause the lamp 9 to glow, while on the retraction of the plunger, as shown in Figures 2, 3 and 4, the circuit connection will be broken and the flow of current to the lamp arrested. Thus when the plunger arm is projected for signaling purposes the lamp will be flashed and caused to glow, producing a light streak whereby maximum attention to the signal will be drawn. While, for example, the type of lamp circuit connections herein shown is closed for illustration of a working structure, it will, of course, be understood that any suitable means for producing the same result may, in practice, be employed.

In Figures 6 to 14, inclusive, I have shown another form of my invention which is of semi-automatic type. In this semi-automatic type of device the construction of the tube 1 and plunger arms 6 may be the same as that previously described, with the exception of the use of a catch or latch device, as hereinafter described, and with the further exception that the plunger arms 6 are adapted to be automatically projected by a coiled spring 18 housed within the tube 1 between said plunger arms, the construction being such that when the plungers are retracted the spring will be compressed. This spring is of sufficient strength when compressed by either plunger to project the plunger outwardly to signaling position on release of a spring-actuated catch or latch pin 19, which holds the plunger retracted against the pressure of the compressed spring. This latch pin 19 is adapted to engage the other end wall of a slot 20 in the tube 1 to hold the plunger arm 6 retracted and from outward movement under the pressure of compressed spring 18. When the pin 19 is projected its outer end lies in contact with the stud 20ª of a push-button 21 carried by the free end of a leaf spring 21ª fastened at its opposite end to the outside of the tube, so that by means of thumb or finger pressure the push-button may be forced inwardly to move pin 19 inwardly to released position, thus freeing the plunger arm 6 for projection to display position by action of spring 18. On release of pressure from push-button 21 its spring 21ª shifts it outward again to normal position. Spring 21ª incidentally covers slot 20 so as to largely prevent entrance of dust and dirt through said slot into tube 1. When the signal arm 6 is drawn backward by means of the finger piece 7 the latch pin will snap into the slot 20 and lock the plunger arm in retracted position. Contact 10 may be provided with a brush portion 10ª for electrical contact with tube 1, through which the ground connection of the lamp circuit is completed and, if desired, pin 19 may be made movable through and in contact with said brush, the contact of pin 19 with the tube 1 giving additional security of a good electrical connection. A conductor wire may be used in place of the contact strip and electrically connected at its adjacent end with pin 19, so that the pin will serve the double function of a latch and contact piece or brush. Figures 7 and 8 disclose the construction of one-half of the tube 1, one of the plunger devices 6 arranged therein, and a portion of the spring, it being understood that in practice, this construction is duplicated at the opposite end of the tube. The plungers 7 in this construction are adapted to be automatically retracted by shifting movements of parts of the steering gear, operative through mechanism connected with the finger pieces 7. In view of the fact that the range of movement of the parts of the steering gear may vary, the slots 7ª and 20 may be made of greater length than the exact travel necessary to shift the plungers backwardly to retracted position, so as to allow them to have any extra inward travel, without interference from the finger piece 7 and the latch pin 19, that may be due to the longer ranges of movement of the parts of the steering gear in order to avoid liability of strain or damage to parts.

The steering gear mechanism for retracting the plungers 6 is arranged in duplicate at each side of the machine, each set of devices comprising an operating lever 22, disposed below the frame or chassis 23 of the vehicle and pivoted thereto, as indicated at 24, for swinging movements laterally of the vehicle. The forward end of this lever 22 is provided with a lateral projection 25 having an inclined or cam surface 26, and the rear end 27 of said lever is slotted to slidably and pivotally receive a wrist pin 28 on a crank arm 29 formed or provided upon the lower end of a transmission rock shaft 30, said shaft 30 being journaled in suitable bearings 31 on the front surface of the dashboard 31ª or some suitable part or parts of the vehicle. At its upper end the shaft 30 carries a crank arm 32 which bears against the outer side of the finger piece 7 of the signal plunger arm at the same side of the vehicle. As shown, the end of arm 32 connected with shaft 30 may be provided with an eye 33 to receive the shaft and a set screw 33ª to fix it thereto, allowing vertical adjustment of arm 32 on shaft 30 as may be required in the application of the device to different makes of automobiles.

The inclined or cam surface 26 of the projection 25 is adapted to be operatively engaged by the knuckle pin 34, yoke or some other part of the steering arm or yoke connection between the same and the connecting rod or tie bar 35 coupling the steering arms 36 which transmit steering motion to the wheel spindles 37 on the front axle 38. The normal position of each cam projection 25, when the signal plungers are retracted and the front wheels are arranged for straight ahead motion, is that shown in Figure 9. Assuming that a left-hand turn is to be made, and the left hand signal plunger is to be projected to give an indication thereof, it will be understood that the latch device holding said plunger is manually released. On the release of this latch, the coiled propulsion spring will operate to project said plunger signal, and in such operation the crank arm 32 will be actuated to rock the shaft 30 in the proper direction to swing the lever 22 so as to throw the projection 25 outward into the path of travel of the knuckle element 34, when the wheels are shifted for a left hand steering turn, as shown in Figure 10, whereby, on the turning motion of the wheels, motion will be transmitted to the lever 22, rock shaft 30 and crank arm 32 to push back finger piece 7 and shift the signal plunger back to non-displaying position, in which it will again be locked by the latch 19. In this operation of the signal steering gear control at the left hand side of the machine, the steering gear control associated with the signal plunger at the right hand side of the machine will remain inactive, as will be readily understood.

From this the operation of the right hand signal device for giving the indication of a right hand turn, and for returning said signal device to normal position, will be readily apparent. The crank arms 32 may be free from connection with the finger pieces 7, and simply have a sliding engagement therewith and pushing action thereon, as shown, so as to permit each finger piece to slide any determined distance in a straight line while the crank arm is having its variable arc of movement, as will be readily understood. This arrangement will also enable any length of arm 32 to be used according to the distance between finger piece 7 and shaft 30 in the application of the invention to different makes and sizes of vehicles.

It is to be understood that the parts may be so constructed and arranged that but a slight movement of the element 34 will be required to shift the coacting plunger signal, after actuation, back to non-displaying position. Instead of employing a knuckle part 34 for a shifting action, a contact 39 on the bar or rod 35 may be provided for engagement with the cam face 26 of the projection 25, as shown in Figure 14. This contact 39 may be slidably mounted on the rod or bar and fixed in adjusted position by a set screw 40, allowing proper positioning of said contact to be made as required.

It will be seen from the foregoing that I have shown a simple form of my invention, which is entirely manually operative, for signaling purpose and which may be employed under some conditions, while I have also disclosed in another form of my invention means whereby, when the catch device is manually retracted, the signal arm will be automatically projected and thereafter automatically returned to non-displaying position and relocked by the steering gear mechanism. In both constructions a simple and effective type of signal mechanism is produced, allowing signals to be given at either side of the machine for clear and unmistakable signal display, and wherein on the projection of each signal arm a luminous supplemental signal will be operated to produce a light streak, whereby attention is directed to the signal, such luminous signal also making the projected signal device, clearly observable at night and at other times. While the preferred forms of my invention are as herein disclosed, it will, of course, be understood that changes in the construction, form and proportion of the parts, falling within the scope of the appended claims, may be made without departing from the spirit or sacrificing any of the advantages of the invention.

Having thus fully described my invention, I claim:—

1. A resetting means for a reciprocable vehicle signal, comprising a pivotally mounted lever member, a cam carried at one end of said member arranged for contact with a movable part of a steering mechanism for swinging the lever, an oscillatory shaft actuated by said lever upon the swinging of the same, and means connecting said shaft with said signal for moving the same from signaling position.

2. A resetting means for a reciprocable vehicle signal, comprising a lever member pivotally mounted adjacent a transversely movable portion of the vehicle steering mechanism, a cam member formed at one end of said lever arranged to be acted upon by said portion to swing the same, a normally vertically arranged oscillation shaft, means connecting said shaft with said lever to oscillate the same upon movement of the lever, and means carried by the shaft for engagement with said signal to move the same to inoperative position.

3. A resetting means for a sliding vehicle signal member having a control finger, comprising an oscillatory shaft, a control arm carried by said shaft for contact with said fingers, a crank arm carried by said shaft, a control lever centrally pivotally mounted adjacent the vehicle steering mechanism, means for setting up a loose connection between one end of said control arm and said crank, and a cam member formed at the other end of said control arm for engagement by and upon the swinging of said mechanism for resetting the signal.

4. A resetting means for a sliding vehicle signal member having a control finger, comprising an oscillatory shaft, a control arm adjustably carried by said shaft adjacent one end, for engagement with said finger, a crank arm formed at one end of said shaft, a control lever pivotally mounted intermediate its ends and having one end slotted for loose sliding connection with said crank arm, and means to provide a cam member at the other end of said control lever arranged to be acted upon by a portion of the vehicle steering mechanism when the same is actuated to retract said signal.

In testimony whereof I affix my signature.

JOHN ARTHUR DES ROSIERS.